June 27, 1950  O. W. ROBERTS  2,513,206
ELECTRICAL FENCE
Filed March 24, 1947
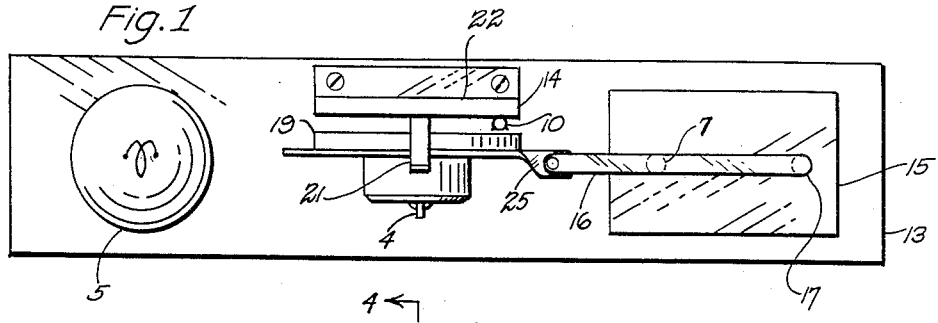
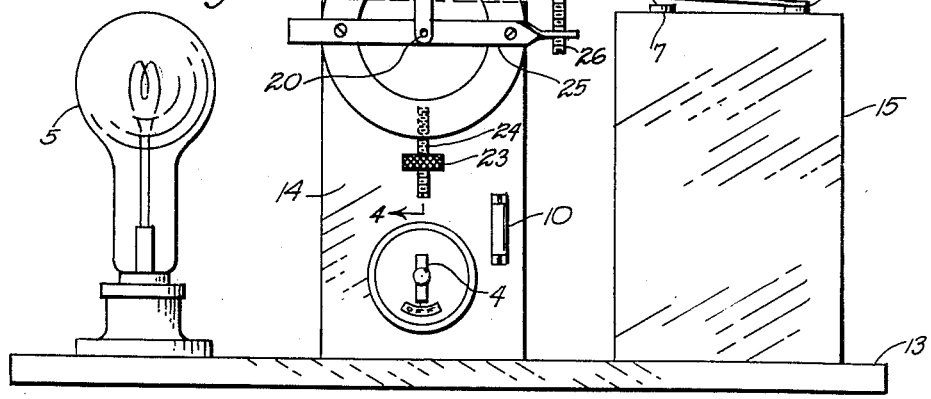
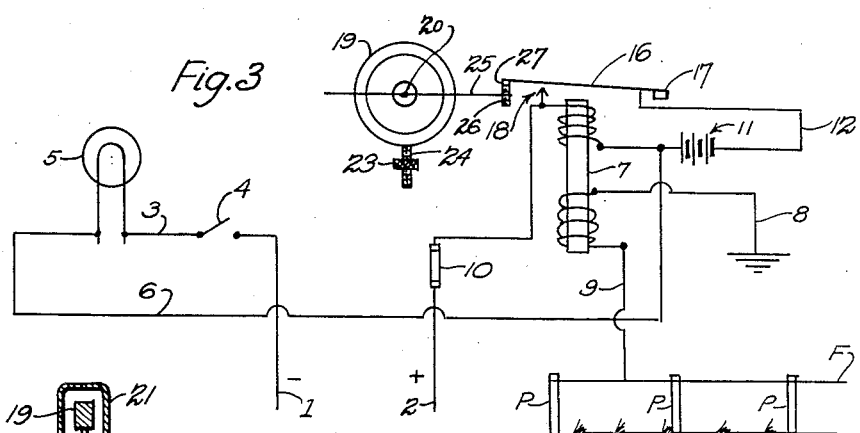
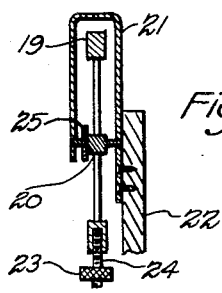
INVENTOR.
Oramel W. Roberts
BY Victor J. Evans & Co.
ATTORNEYS

UNITED STATES PATENT OFFICE 2,513,206

ELECTRICAL FENCE

Oramel W. Roberts, Beaverville, Ill.

Application March 24, 1947, Serial No. 736,892

4 Claims. (Cl. 171—97)

My present invention relates to the general class of electrical fences, and more specifically to an intermittently energized electrical fence for use in enclosing farms, pastures, and other agricultural lands, as well as for enclosing other property for protective purposes, and for confinement of inmates.

The primary object of the invention is the provision of a control system for imparting pulsations to an electrical fence, which system is made up of a comparatively few component appliances or parts that are readily available for use and may with facility be assembled to provide control mechanism that is reliable, inexpensive in cost and maintenance, and which may be adjusted with convenience for timing the pulsations to the fence, as desired.

The invention consists essentially in certain novel combinations and arrangements of parts involving an electro-magnetic control circuit and a fence-charging circuit under control thereof, together with mechanically operated means for timing the pulsations, as will hereinafter be described and more specifically pointed out in my appended claims.

In the accompanying drawings I have illustrated a complete embodiment of my invention wherein the parts are combined and arranged in accord with one mode I have devised for the practical application of the principles of my invention; but it will be understood that changes and alterations are contemplated and may be made in these exemplifying drawings and mechanical structures, within the scope of my claims, without departing from the principles of the invention.

Figure 1 is a plan view of the appliances and control devices for imparting the intermittent pulsations to the electrical fence in accord with my invention; and Figure 2 is a view in elevation of the structures in Fig. 1.

Figure 3 is a wiring diagram of the electrically controlled system; and

Figure 4 is a vertical sectional detail view at line 4—4 of Fig. 2 through the balance wheel and its accessories.

Referring to the wiring diagram in Fig. 3 an illustration of a portion of an electrically charged fence includes the spaced posts P, P, and the electrically charged fence wire F supported in usual manner on the posts; and the circuits and appliances for controlling the pulsations to the fence receive electrical energy up to say 110 volts from the main line plus wire 1 and minus wire 2 from a suitable source. The negative lead wire extends through a circuit 3 having a main control switch 4, and the main line voltage is stepped down through a resistor 5, preferably in the form of a two hundred watt electric lamp as shown.

From the main circuit a wire 6 extends to the charging circuit which is under control of a magnetic coil 7, the charging circuit being grounded at 8, and extended to the wire F of the fence through charging wire 9.

The main plus or positive wire 2, which is provided with an emergency fuse 10, enters the control circuit, and a battery 11 and wire 12 complete the charging circuit.

In Figs. 1 and 2 the appliances of the control station of the system are illustrated as mounted upon a base 13, together with the resister 5, a switchboard 14, and the casing 15 for the magnetic coil or electro-magnet 7.

Intermittent charging currents from the battery are imparted to the wire 9 by means of the electro-magnetic switch which intermittently opens and closes the charging circuit carrying a current that is stepped down by the transformer to approximately six volts.

For this purpose a pulsating switch including an armature 16 is mounted at 17 on a suitable support of the casing 15, in position to be attracted by the electro-magnet 7, and the armature is intermittently pulled down to contact point 18 for instantaneously closing the battery circuit for charging the fence.

This intermittent action of the control switch in charging the fence is caused by the use of an oscillatable gravity actuated mechanism including a balance wheel or pendulum device 19 that is journaled at 20 in a yoke or frame 21 rigidly mounted upon a suitable support or frame member 22 of the board 14.

The balance wheel is provided with an adjustable weight 23 threaded on a screw bar 24 to form a pendulum attached to the balance wheel, and the wheel is provided with a diametrically arranged, or horizontal pulsation arm 25, in the end of which is mounted an adjustable timing screw 26 located in the path of movement of a lug or head 27 rigidly mounted at the free end of the armature or switch arm 16 of the intermittent switch.

When the main switch 4 is closed, the electro-magnet is energized to pull the armature and close the control switch of the charging circuit, thereby sending an electrical impulse from the battery through the wire 9 to the fence F.

As the armature is pulled down to close the switch 18, the lug 27 on the end of the armature strikes the timing screw 26 of the pulsation arm, and by impact, swings the balance wheel on its journal bearing clockwise in Fig. 2. Then, under influence of gravity the weighted wheel now swings in reverse movement carrying the timing screw 26 up into contact with the lug 27 of the armature to lift the armature and open the charging switch 18 of the battery circuit; and this performance is repeated intermittently for charging the fence wire F.

The timing of the pulsations or intermittent electrical charges to the fence wire may be changed or adjusted within a range of approximately twenty to forty charges per minute, by adjusting the pendulum weight 23 on its screw bar to change the oscillations of the balance wheel, and also by adjusting the timing screw 26 of the pulsation arm 25 with relation to the head or lug 27 of the armature 16. The armature may be pivotally supported at one end for a free movement, or the armature may be fashioned of resilient metal, for co-ordination with the oscillations of the balance wheel, and to impart the required swing to the wheel that will result in a reverse movement of the wheel of sufficient power to lift the armature and open the control switch 18.

Having thus fully described my invention, what I claim as new and desire to secure by Letters Patent is:

1. In a system for intermittently charging an electrical fence, the combination with a control circuit including a source of electrical energy, a main switch and an electro-magnet, of a charging circuit, a fence circuit inductively connected to the charging circuit, a battery for the charging circuit, a switch in the charging circuit having a pivoted armature movable by the electro-magnet to close the charging circuit and a pendulum for intermittently moving the armature in a reverse direction to open the charging circuit for the intermittent operation of the fence circuit for the charging of the fence.

2. The system as in claim 1 wherein means is carried by the armature for oscillating the pendulum.

3. The system as in claim 1 wherein means is carried by the armature for oscillating the pendulum and means is provided on the pendulum for regulating the period of vibration of the pendulum.

4. The system as in claim 1 wherein the pendulum comprises a weighted balance wheel having an arm terminating in the path of movement of the armature whereby the wheel is moved in one direction by impact of the armature and in the opposite direction by gravity, and means for regulating the period of vibration of the wheel is carried by the arm thereof.

ORAMEL W. ROBERTS.

REFERENCES CITED

The following references are of record in the file of this patent:

UNITED STATES PATENTS

| Number | Name | Date |
| --- | --- | --- |
| 2,398,442 | Moore | Apr. 16, 1946 |
| 2,429,764 | Moore | Oct. 28, 1947 |

FOREIGN PATENTS

| Number | Country | Date |
| --- | --- | --- |
| 109,051 | Australia | Nov. 8, 1939 |